United States Patent
Poynter

[15] 3,657,457
[45] Apr. 18, 1972

[54] APPARATUS FOR TESTING DRIVING SKILL

[72] Inventor: Donald B. Poynter, 7 Arcadia Place, Cincinnati, Ohio 45208

[22] Filed: July 22, 1970

[21] Appl. No.: 57,122

[30] Foreign Application Priority Data

Sept. 22, 1969 Japan....................................44/75776

[52] U.S. Cl..................................35/11, 46/240, 273/1 M, 273/86 B
[51] Int. Cl......................................G09b 9/04, A63h 33/26
[58] Field of Search.............35/11, 7 A; 273/1 E, 1 M, 86 B; 46/240

[56] References Cited

UNITED STATES PATENTS

| | | | |
|---|---|---|---|
| 2,806,323 | 9/1957 | Oback | 46/240 |
| 3,326,555 | 6/1967 | Warren | 46/240 X |
| 3,525,175 | 8/1970 | Wolf | 46/240 |
| 3,013,343 | 12/1961 | Simjian | 35/11 |
| 3,231,988 | 2/1966 | Freyde | 35/11 |

Primary Examiner—Wm. H. Grieb
Attorney—J. Warren Kinney, Jr.

[57] ABSTRACT

For testing driving skill, a console having the appearance of an automobile hood, includes steering apparatus whereby a miniature vehicle may be guided along a surface of a rotary turntable, using magnetic force in guiding the vehicle. Turntable speed and direction are controllable by instrument panel elements energized by dry cells within the console.

26 Claims, 26 Drawing Figures

Patented April 18, 1972 3,657,457

INVENTOR
DONALD B. POYNTER
BY J. Warren Kinney Jr.
ATTORNEY

Patented April 18, 1972

INVENTOR
DONALD B. POYNTER
BY J. Warren Kinney Jr.
ATTORNEY

Patented April 18, 1972
3,657,457
6 Sheets-Sheet 3
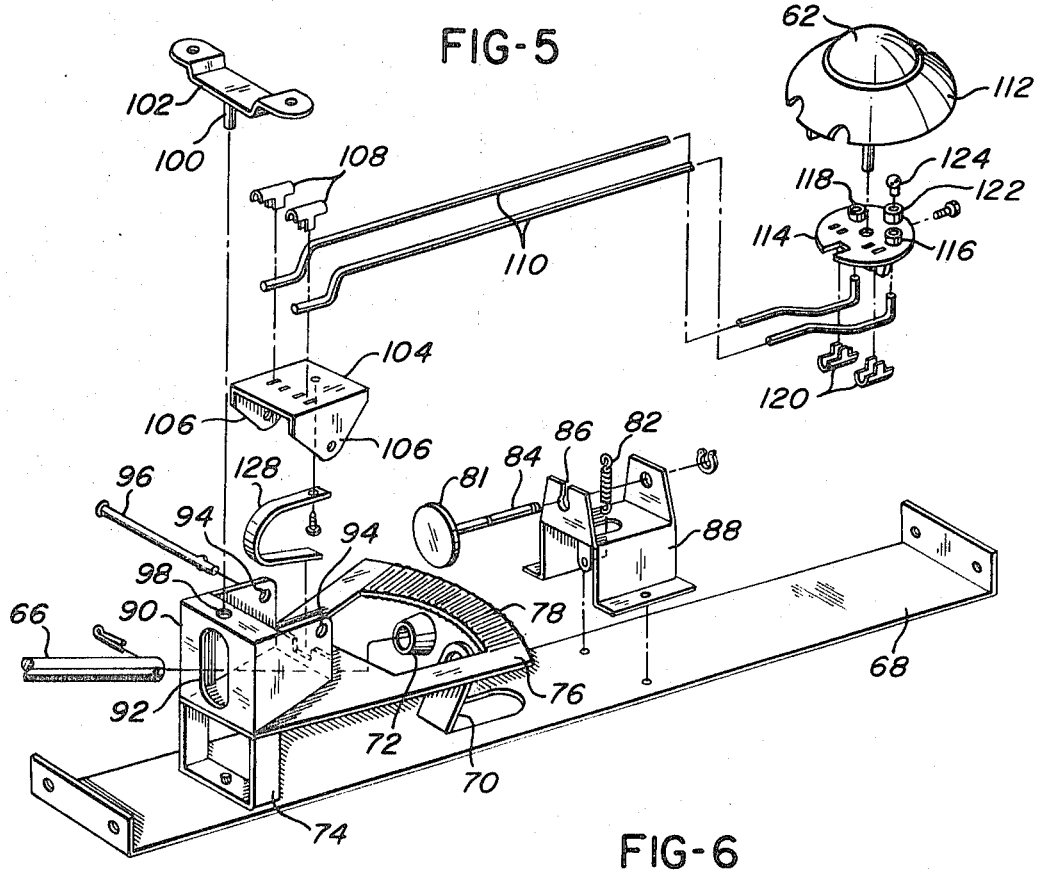
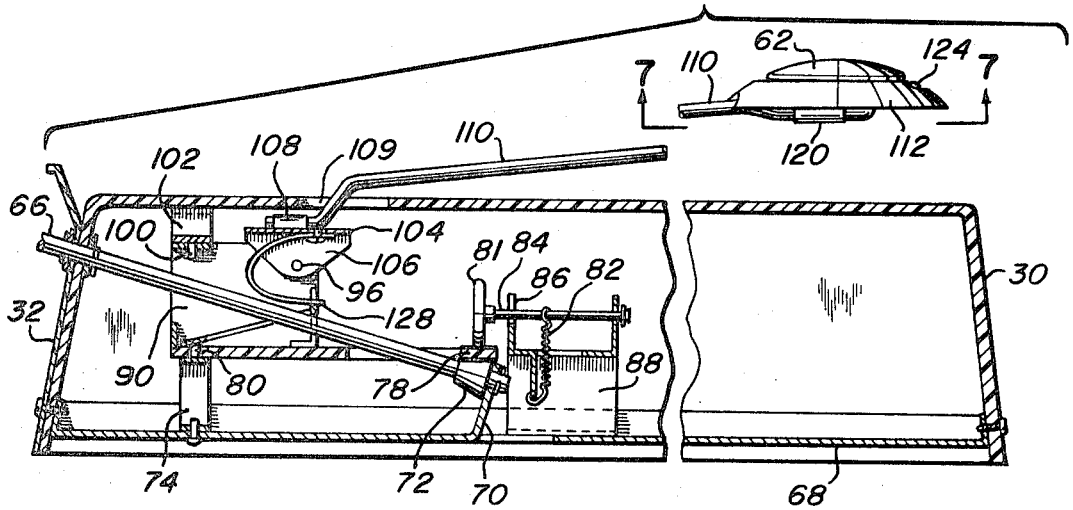
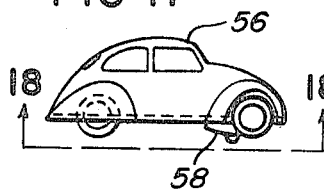
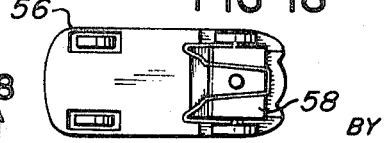
INVENTOR
DONALD B. POYNTER
BY J. Warren Kinney Jr.
ATTORNEY

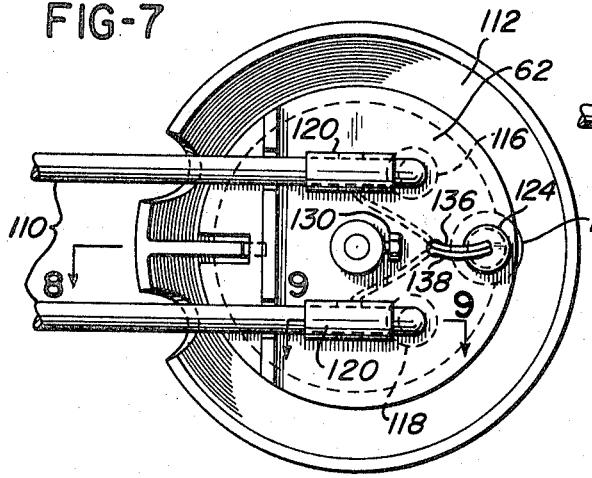
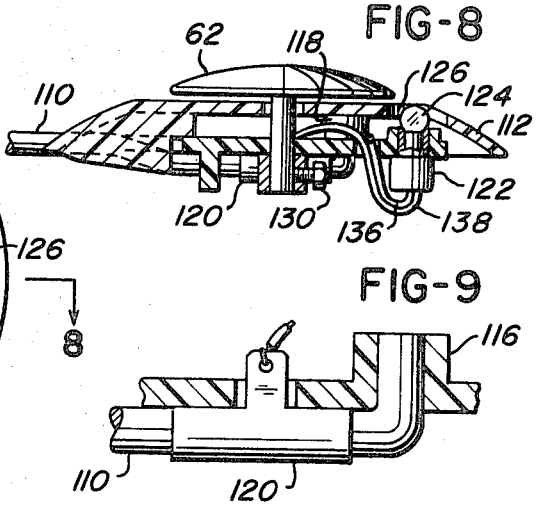
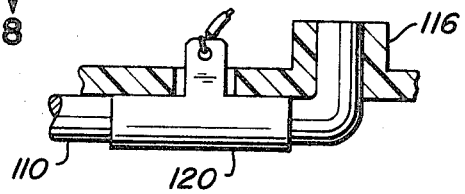
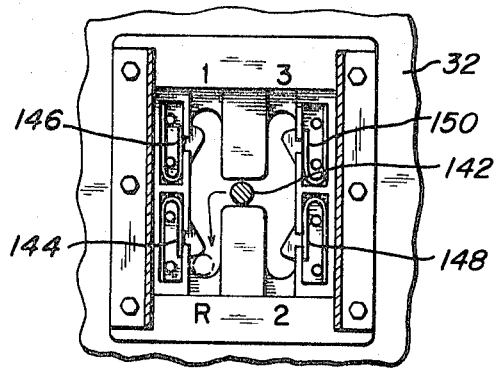
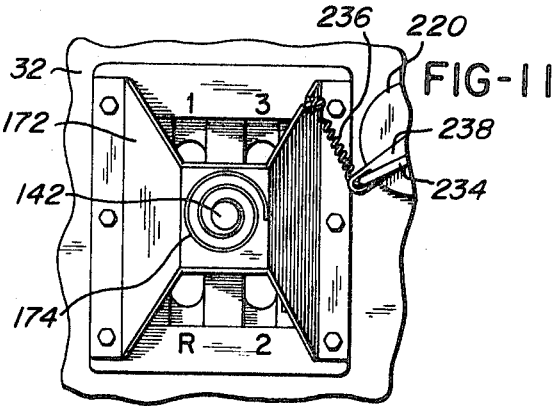
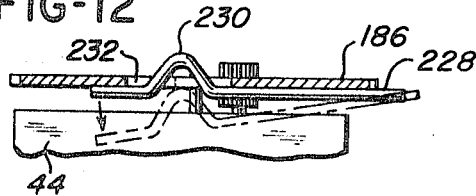
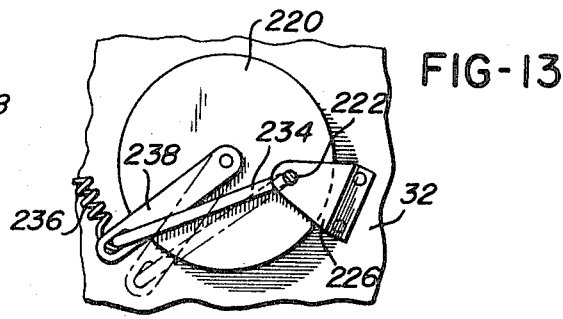
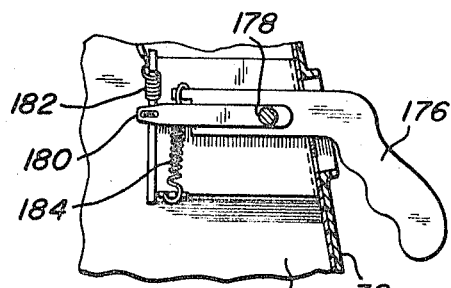
INVENTOR
DONALD B. POYNTER
BY J. Warren Kinney, Jr.
ATTORNEY

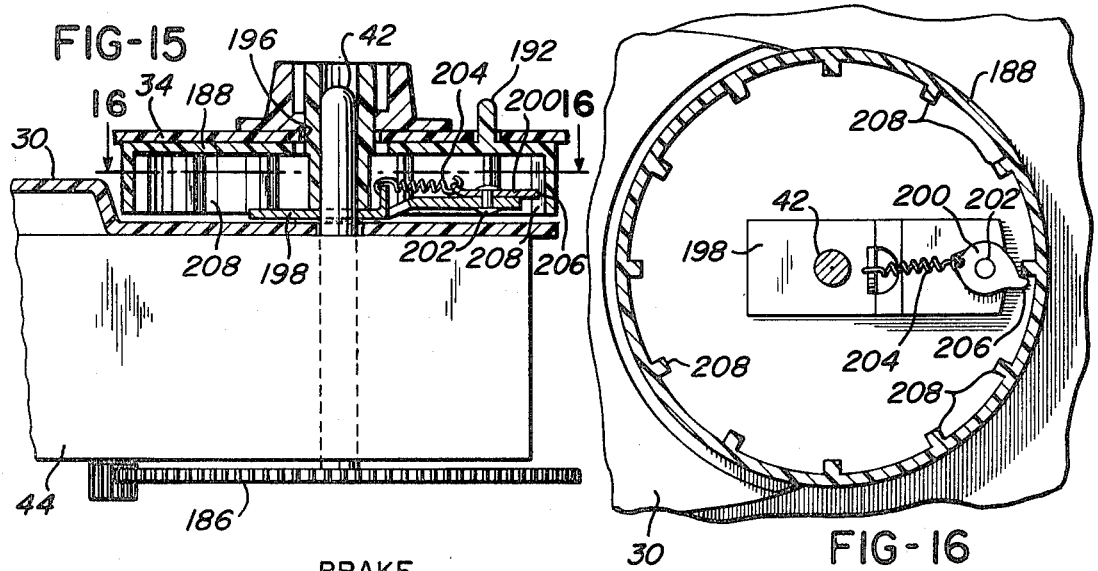
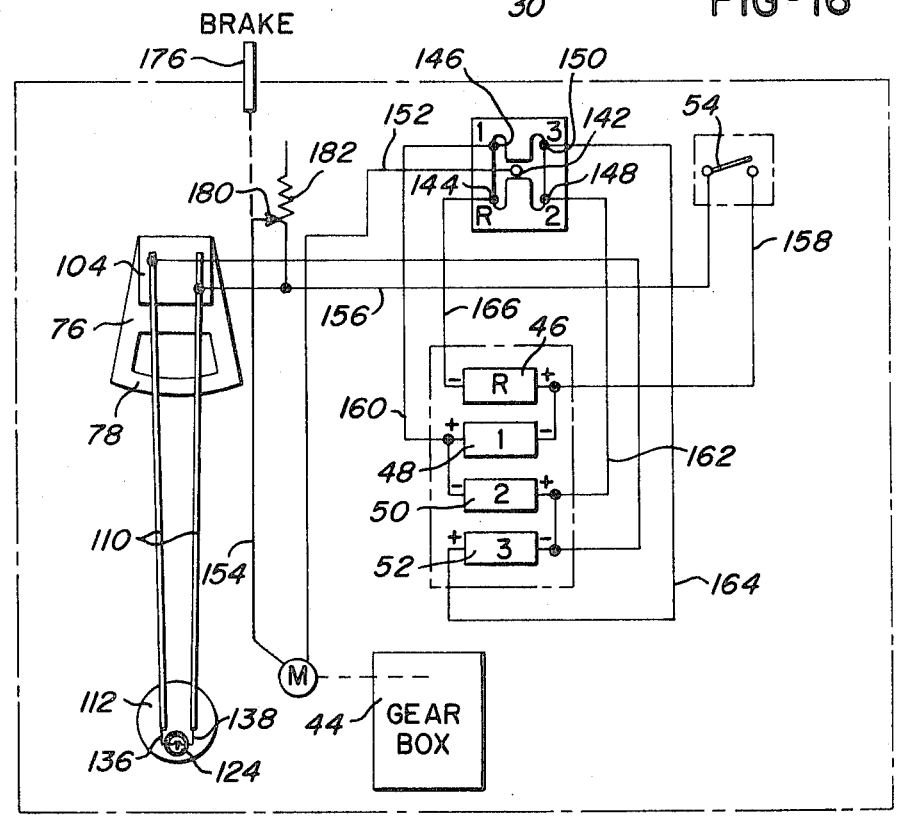
INVENTOR
DONALD B. POYNTER

Patented April 18, 1972

INVENTOR
DONALD B. POYNTER

BY J Warren Kinney Jr.
ATTORNEY

APPARATUS FOR TESTING DRIVING SKILL

The present invention relates to apparatus for testing the driving skill of operators, or prospective operators, of automobiles or other vehicles. The apparatus is adapted also for use as a game or amusement device for developing skill in the operation of a vehicle.

In brief, the apparatus comprises portable console or base member a portion of which resembles the instrument panel of a typical automobile or other vehicle having a steering wheel or member used for directing the vehicle. The vehicle may be a miniature automobile, truck, van, bus or the like, or if desired, it may resemble a motorcycle, sled, boat, or any other form of vehicle capable of being steered or guided and otherwise controlled.

The instrument panel may include a steering wheel, a brake handle, a gear shift lever, an ignition switch, and one or more indicators in simulation of the typical instrument panel of a typical vehicle. If desired, the assembly may include a simulated radio or television signal receiving antenna, useful as a timer as will be explained.

The console carriers an upright rotatable shaft to accommodate a turntable upon which may be supported a suitable miniature vehicle. The turntable may be provided with simulated roadways, pathways or the like along which the vehicle may be guided by means of the steering wheel as the turntable rotates. The turntable may include various obstacles or hazards, and the pathway provided thereon is preferably tortuous. The pathway may include miniature hills and valleys if desired.

The miniature vehicle carriers a magnetic member in close proximity to the turntable surface, and beneath the turntable is a cooperative magnetic member carried by a control arm to be manipulated by the steering wheel. The steering wheel acts to swing the movable control arm laterally beneath the turntable in close proximity therewith, so that the magnetic element of the control arm by magnetic attraction influences the position of the vehicle atop the turntable, and its relationship to the road or pathway. Thus, as in FIG. 1, the miniature vehicle held captive by the magnetic elements, may be steered between the bridge abutments shown, as the turntable rotates. Rotation of the turntable is subject to control by the operator.

Lack of skill on the part of an operator can result in displacement of the vehicle from the roadway, and possible release thereof from the magnetic attraction of the control arm magnet. The vehicle then is out of control and requires repositioning upon the turntable within the sphere of influence of the control arm magnet. The turntable is subject to speed variations and reversal of rotation, as will be explained.

An object of the invention is to provide a novel apparatus for testing driving skill, which apparatus is simple, inexpensive, and highly attractive to persons of all ages, so that its possibilities of commercialization are practically without limit.

Another object of the invention is to provide an apparatus of the character stated, which may be used as a teaching aid for vehicle drivers or prospective drivers of vehicles; or if desired, the apparatus may be used as a game device wherein two or more players match skill in speed or obstacle track driving competition.

Another object is to provide a novel arrangement of dry cells and circuitry for operation of the apparatus in a most realistic manner, thereby to stimulate interest in the device and enhance its sales appeal.

A further object of the invention is to provide a device of the character stated which is electrically safe as to its operation, and highly durable in service.

The foregoing and other objects are attained by the means described herein and illustrated upon the accompanying drawings, in which:

FIG. 5 is an exploded perspective view of the magnetic control arm and steering mechanism of the device.

FIG. 6 is an enlarged cross-section taken on line 6—6 of FIG. 4.

FIG. 7 is a bottom plan view of the control arm head, taken on line 7—7 of FIG. 6.

FIG. 8 is a cross-section taken on line 8—8 of FIG. 7.

FIG. 9 is a detail view in cross-section, taken on line 9—9 of FIG. 7.

FIG. 10 is an enlarged cross-section taken on line 10—10 of FIG. 4, showing details of a simulated gear shift control unit.

FIG. 11 is a plan view of the FIG. 10 unit.

FIG. 12 is an enlarged cross-section taken on line 12—12 of FIG. 4, showing part of a lap counter actuator.

FIG. 13 is an enlarged cross-section of a lap counter, taken on line 13—13 of FIG. 4.

FIG. 14 is an enlarged cross-section of a simulated brake mechanism, taken on line 14—14 of FIG. 4.

FIG. 15 is an enlarged cross-section taken on line 15—15 of FIG. 3, showing a turntable drive means.

FIG. 16 is a cross-section on line 16—16 of FIG. 15.

FIG. 17 is a side elevation of a miniature vehicle such as may be used according to FIG. 1.

FIG. 18 is a bottom plan view of the vehicle, taken in line 18—18 of FIG. 17.

FIG. 22 is an electrical circuit diagram for the device of the invention.

Figure 1:
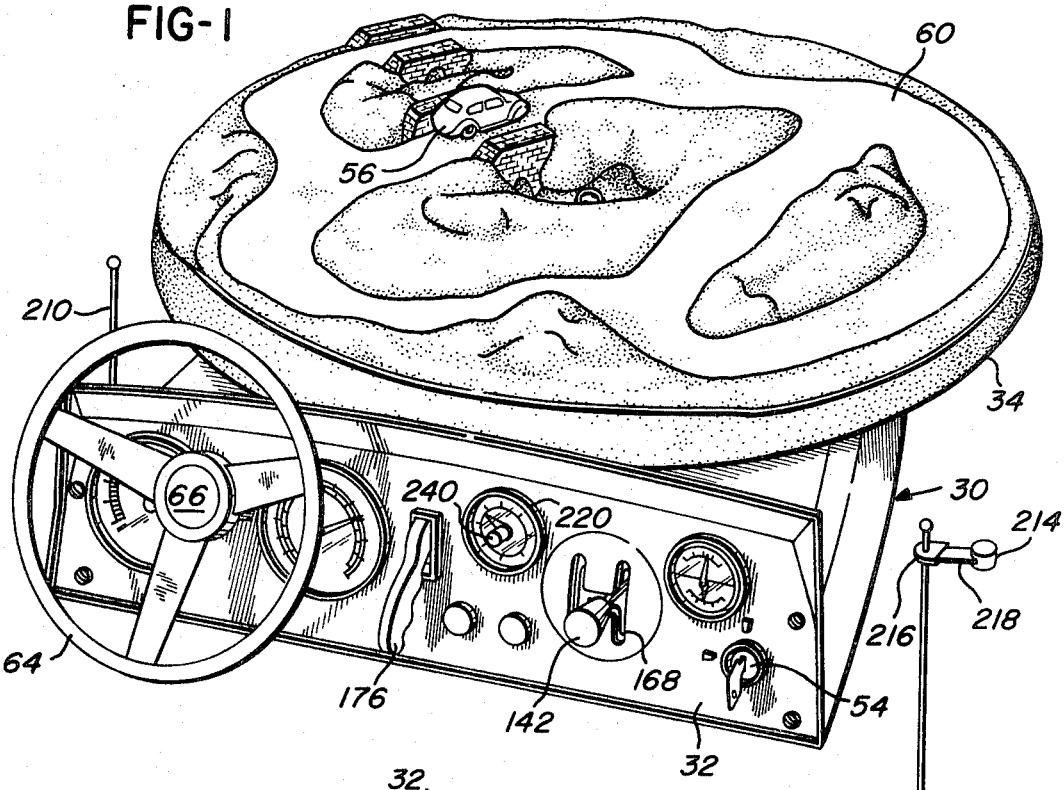
FIG. 1 is a perspective rear view of the device of the present invention, with a turntable and a miniature vehicle in position thereon for manipulation.

In the example illustrated, the base member or console 30 may be molded or otherwise formed in simulation of an automobile forward hood, which includes an instrument panel 32. Any suitable material may be used in forming the base member or console; for example, a plastic material, sheet metal, or any paperboard product such as paper mache would suffice. The same materials may be used in forming the various turntables 34, 36, 38 and 40, and such variations thereof as may be considered desirable.

The console carries an upright rotatable drive shaft 42, upon which a turntable is centered and locked for rotation with the shaft. Shaft 42 is driven by a variable speed reversible electric motor M transmitting motion through a suitable speed-reducing gear box 44. Electrical energy for driving the motor may be supplied by several dry cells or flashlight batteries denoted 46, 48, 50, 52 arranged in series. An ignition switch 54 on the instrument panel is provided for primary control of the flow of electric current through the energizing means or dry cells mentioned.

The miniature vehicle 56 is quite small, and may be one of the so-called "matchbox" variety; however, any small vehicle of any type may be adapted for use in accordance with the present invention. The vehicle is provided with an underslung permanent magnet 58 which may be fixed thereto near the forward end of the vehicle. The magnet is arranged for disposition very close to a surface upon which the vehicle may be placed in upright position.

The vehicle may carry front and rear wheels, or rear wheels only, in which latter case the magnet may support the front end of the vehicle. If the magnet is used as a support for the front end of the vehicle, it should have a smooth under face to avoid scarring of any surface supporting the vehicle, or in the alternative, the magnet may carry a small nylon button or the like elevating the magnet slightly above the supporting surface. In any event, suitable means are provided to prevent scarring of a supporting surface by the magnet, and to maintain the magnet in close proximity with such supporting surface.

Figure 23:
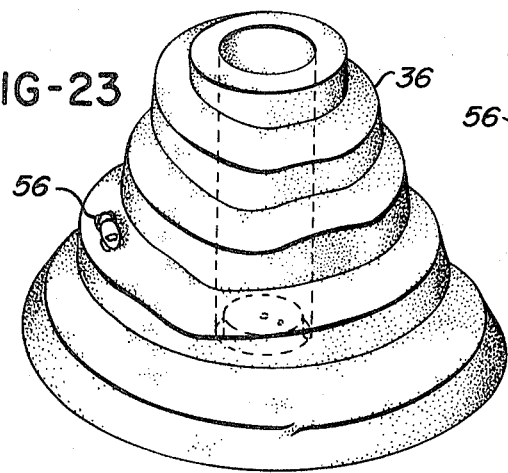
FIGS. 23, 24 and 25 are perspective views of suggested turntable types other than that of FIG. 1, which might be applied in using the device of the invention.
Figure 24:
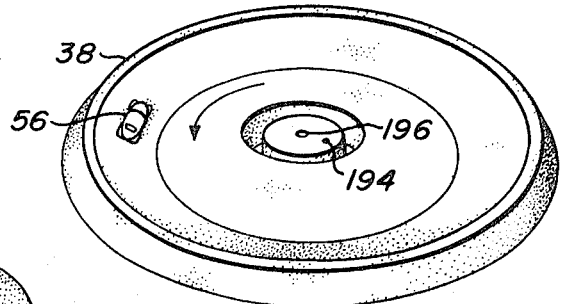
Figure 25:
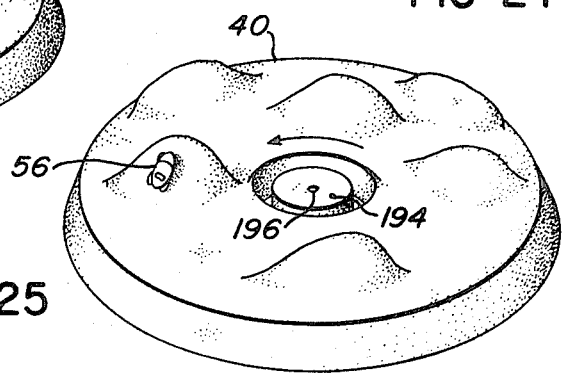

The supporting surface for the vehicle, of course, is the upper surface of a turntable as shown. In the FIG. 1 example, the turntable is a molded or shaped circular body formed to present a roadway, path, or track 60 which may be undulatory and tortuous, and adapted to support the vehicle in upright position. Along the roadway may be located culverts, steep slopes, walls and other roadway hazards. The substitute turntables of FIGS. 23, 24 and 25, present respectively, a spiral mountain roadway, a banked circular raceway, and a roadless hilly terrain representative of a group of sand dunes or the like. The several forms of turntables shown will of course suggest others of an interesting nature.

Figure 3:
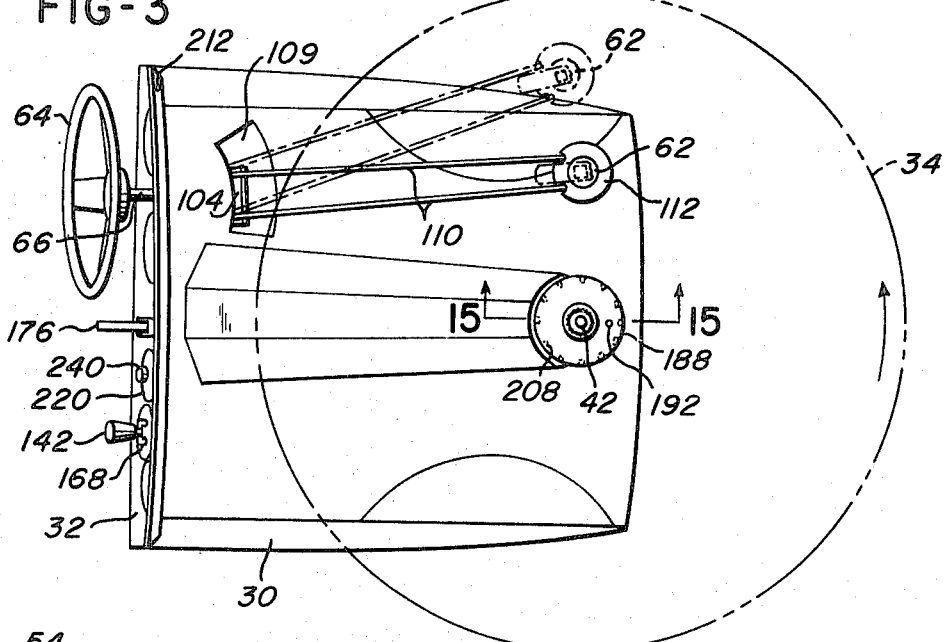
FIG. 3 is a top plan view of FIG. 2.

It will be understood that the surface which supports the vehicle 56 should be such that magnetic lines of force may pass between the vehicle magnet 58 and a control magnet 62 located beneath the turntable in close proximity to the track area 60. In this way, the permanent magnet 62 when swung toward and from the turntable shaft 42 (FIG. 3), incident to rotation of steering wheel 64, will determine the accuracy with which the vehicle 56 follows the roadway during rotation of the turntable. The steering element or wheel 64 is fixed upon a steering shaft 66.

The steering gear may comprise an elongate bracket 68 secured at its opposite ends to base member 30. A lug 70 struck from the bracket material is perforated to receive and rotatably support the forward end of steering shaft 66. A conical friction wheel 72 is fixed upon shaft 66 for rotation therewith. The shaft is supported also at the instrument panel 32.

A stool 74 upstanding upon bracket 68 supports a swing plate 76 having a curved track portion 78 which overlies and bears upon the friction cone 72. Plate 76 is pivoted at 80, to permit swinging movement thereof about the pivot as friction cone 72 rotates against the friction track portion 78 incident to manipulation of the steering shaft 66. As shown, track portion 78 is serrated or otherwise roughened to enhance frictional engagement with cone 72.

A pressure device in the form of a wheel 81 pressed against the upper face of track 78 by spring 82, ensures frictional drive contact between cone 72 and track 78. The shaft 84 of wheel 81 is bodily shiftable vertically within a slot 86 of stationary support member 88, by the action of spring 82, to maintain the frictional drive contact mentioned, (FIG. 6).

At a location remote from track 78, the swing plate carries an upstanding box-like housing 90 which is fixed thereto. Housing 90 has an opening 92 to loosely accommodate the steering shaft. It also has a pair of perforations 94—94 to receive a rock shaft 96, and another perforation 98 to loosely receive the pivot pin 100 of a bracket 102 fixed within base member 30. The pivot pins 80 and 100 support the assembly 76—90 for swinging movement in a horizontal plane, incident to manipulation of the steering shaft and wheel 64.

Rock shaft 96 supports for rocking movement in a vertical plane, the yoke 104 whose perforate ears 106, 106 pivot upon the rock shaft. Secured to the yoke 104, as by means of simple clips 108, is a pair of elongate stiff tubes 110 which extend forwardly through an opening 109 to a location beneath turntable 34. The tubes 110 constitute a control arm carrying at their free ends a control head 112 upon which is mounted the permanent magnet 62.

Control head 112 may include a base plate 114 carrying bushings 116 and 118 receptive of the upturned ends of tubes 110. Clips 120, 120 anchored to plate 114 secure the plate to the tube ends. Plate 114 carries also a socket 122 supporting an electric light bulb 124. Electric current for energizing the light bulb may be supplied by conductor wires extended through or about the tubes 110, 110. The head 112 may be provided with an opening 126 (FIG. 8), to expose bulb 124.

As was previously mentioned, the members 110 constitute the control arm of the apparatus. It is considered desirable that the control arm be arranged to constantly yieldingly urge the control head 112 upwardly against the underface of the turntable in order to compensate for irregularities in the underface thereof. For this purpose, a leaf spring 128 may be arranged with one end thereof bearing against a portion of housing 90, and the remaining end bearing against yoke 104 so as to yieldingly urge yoke 104 counterclockwise about shaft 96, (FIG. 6). Such action of the leaf spring constantly urges the control arm head 112 and magnet 62 upwardly against the turntable, notwithstanding the undulatory nature of portions of the turntable exposed to the head during rotation of the turntable.

Figure 20:
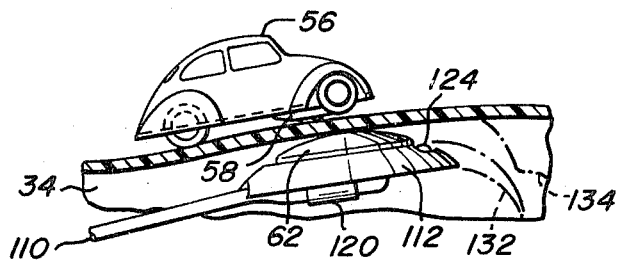
FIG. 20 is an enlarged cross-section taken on line 20—20 of FIG. 19.
Figure 21:
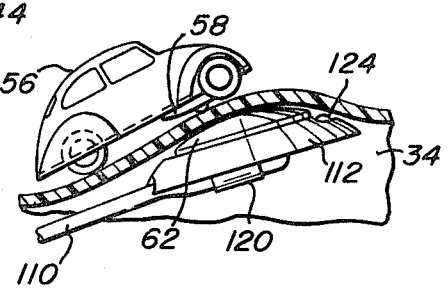
FIG. 21 is a view similar to FIG. 20, with the turntable roadway shown at a location of extreme inclination accommodated by the control head.

As is best illustrated upon FIGS. 5 and 8, a screw 130 may be employed to lock the magnet and its upright stem to the control head. The head may be formed of an electrically nonconductive plastic material, and both the head and its magnet may be substantially dome-shaped or otherwise contoured to assure tracking without binding against undulatory or angular portions of the turntable underface. In this connection, reference may be made to FIGS. 20 and 21 wherein it may be assumed that the turntable 34 is moving the left relative to head 112 and vehicle 56. If desired, the head may be provided with a fender, as shown at 132, to guide it past any obstruction such as 134 depending from the turntable underface.

From the foregoing, it will be understood that the operator of the device, after placing the turntable in motion, may use the steering wheel 64 to swing the control arm 110 and its head 112 to and fro, for magnetically guiding the miniature vehicle 56 along the moving roadway with a measure of skill. Increasing the speed or rotation of the turntable demands additional steering skill, and a lack of sufficient skill may cause the vehicle to leave the roadway and strike an obstruction or a steep slope, resulting in breaking the normal magnetic attraction between the magnets with consequent loss of control over the vehicle. The turntable then may be stopped, and the vehicle replaced upon the roadway.

It is considered desirable that the roadway 60 be somewhat translucent so that light from the lamp 124 may shine through, thereby affording a clear indication of where a vehicle may be placed in order to register its magnet with that of head 112. The translucent roadway with the head light shining through, serves also to create the illusion that the vehicle carries operative headlamps attractively illuminating the roadway.

By referring to the wiring diagram, FIG. 22, it is noted that conductors 136, 138 connected to lamp 124, are in circuit with the ignition switch 54 and the power source, so that closing of the switch 54 energizes the lamp 124. The circuit includes a resistor 140 which limits current flow through the lamp.

One of the desirable features of the apparatus is that it includes a simulated gear shift operable by a shift lever 142. Lever 142 is movable manually to any one of five position according to the well-known H-type manual gear shift system. As depicted by FIG. 10, the shift lever 142 is in the neutral position; however, it can be readily displaced to position R (reverse), or to positions 1, 2 or 3 signifying low, second (intermediate), or high speed gears, respectively. It should be understood that lever 142 shifts no gears whatsoever, but instead, it closes certain electrical circuits when moved to the positions R, 1, 2 or 3.

At position R is located a spring contact 144; at low speed 1 is a spring contact 146; at second or intermediate speed 2 is a spring contact 148; and at high speed 3 is a spring contact 150. The shift lever itself is of metal, and serves as an electrical contact in a circuit comprising conductors 152, motor M, and conductors 154, 156, 54 and 158.

Contact 144 is connected to the negative pole of cell 46; contact 146 is connected to the positive pole of cell 48; contact 148 is connected to the positive pole of cell 50; and contact 150 is connected to the positive pole of cell 52. However, all of the dry cells 46, 48, 50, 52 are connected in series relationship one with another, as the diagram indicates.

By reason of the arrangement specified in the paragraph next above, displacement of shift lever 142 to position 1, or low speed position, will complete the circuit 48, 160, 146, 142, 152, M, 154, 156, 54, 158 back to the cell 48 at its negative pole. Thus, the energy from the two cells 46 and 48 is directed to motor M, and said motor will operate with the limited current of two cells to drive the gear box 44 and turntable 34 at a moderate rate of rotational speed.

Now if the shift lever 142 is displaced to position 2, or intermediate speed position, the circuit completed will include three rather than two dry cells, thereby to somewhat increase the speed of motor M, and consequently also the speed of turntable 34. In this case, the circuit completed will comprise the positive pole of cell 50, and conductors 162, 148, 142, 152, M, 154, 156, 54, 158 then to the negative pole of cell 50 through the interconnected cells 46 and 48.

A still greater turntable speed is made available by moving the shift lever 142 to position 3, which results in directing the energy of all four dry cells to motor M, for operating the motor at high speed. In this case, the circuit completed will comprise the positive pole of cell 52, and conductors 164, 150, 142, 152, M, 154, 156, 54, 158, then to the negative pole of cell 52 through the interconnected cells 46, 48 and 50.

Reversal of motor M is effected by moving the shift lever 142 to position R, thereby reversing the current flow through the motor to drive its shaft in reverse direction. In this case, the circuit completed comprises the positive pole of cell 46, and conductors 158, 54, 156, 154, M, 152, 142, 144, and conductor 166 to the negative pole of cell 46.

From the foregoing, it is apparent that the operator of the apparatus may select the speed and the direction of rotation of the turntable, by manipulating the simulated gear shift lever 142.

It may here be noted that the gear shift lever 142 extends through an "H" opening 168 at the instrument panel, and projects to a universal coupling or swivel 170 which permits lateral displacement of the lever from a neutral or central position to each of the positions R, 1, 2 and 3 of FIG. 22. The coupling 170 may be located upon a stationary stool 172 at a distance from the inner face of the instrument panel. A spiral spring 174 may be used as the coupling means, if desired.

The several contacts associated with the shift lever 142 and denoted 144, 146, 148 and 150, are preferably spring contacts designed to hold the lever in electrical engagement with said contacts until by manual effort the lever is shifted to the neutral position. Accordingly, it is unnecessary to manually hold the gear shift lever in any circuit-closing position.

The apparatus may include, in addition to the turntable speed control means just described, a second or auxiliary speed control means in the form of a simulated brake mechanism which includes a brake handle 176 located upon the instrument panel. The brake handle may by manually movable in a clockwise direction of rotation (FIG. 14), about a stationary pivot 178, to progressively advance a movable electrical contact 180 along a resistance wire 182 which is in series connection with motor M. The resistance wire 182 may be so valued as to afford a substantial range of motor speed reduction, dependent upon the extent to which the brake handle is displaced from the normal or neutral position of FIG. 14. The resistance may be so valued as to completely stop the motor M when the brake handle is lowered to extreme braking position.

Tension spring 184 serves to yielding return the brake handle to the neutral or "off" position; however, said spring may be omitted if desired, so that the brake handle may remain in any desired position selected by the operator. The brake handle is operative to reduce the speed of motor M in all closed-circuit positions of gear shift lever 142.

In a preferred form of the invention, a simple friction clutch is provided in connection with the turntable drive so as to protect the drive from injury in the event that the turntable is held against rotation while motor M is in operation. A simple clutch for the purpose is illustrated by FIGS. 15 and 16, wherein the turntable shaft 42 is shown positively driven by one of the gears 186 of reduction gear box 44.

Upon the upper end portion of shaft 42 is loosely applied a turntable support disc 188. Said disc includes a central hub 190 provided with a bore larger than the diameter of shaft 42, so that the shaft is capable of rotating relative to the disc. The upper margin of disc 188 is adapted to support a turntable such as 34, and may carry an upstanding drive stud 192 to engage an offset opening 194 of the turntable, (FIGS. 19, 23, 24, 25). A central opening 196 of the turntable loosely accommodates drive shaft 42. If desired, the extreme upper end of the drive shaft may carry a suitable fastener (not shown) to preclude accidental disassociation of the turntable for support disc 188.

Shaft 42 (FIGS. 15, 16), may carry a torque arm 198 which is fixed thereto, and the outer free end of the torque arm may carry a pawl 200 pivoted upon the arm at 202. A tension spring 204 having opposite ends anchored to the pawl and to arm 198, serves to constantly yieldingly extend in outward direction the tooth 206 of the pawl. Thus, the tooth 206 normally may engage any one of a number of inwardly directed lugs 208 formed on disc 188, for imparting rotation to the disc as the arm 198 rotates with shaft 42.

From the foregoing, it willbe understood that any substantial opposition to rotation of disc 188 and the turntable poised thereon while shaft 42 is rotating, will cause pawl tooth 206 to override lug 208 engaged thereby, so that torque arm 198 may rotate as driven by motor M without necessarily rotating the disc and its superposed turntable. The arrangement clearly operates as a slip clutch or safety device protecting the mechanical parts against injury in the event of improper usage.

Figure 2:
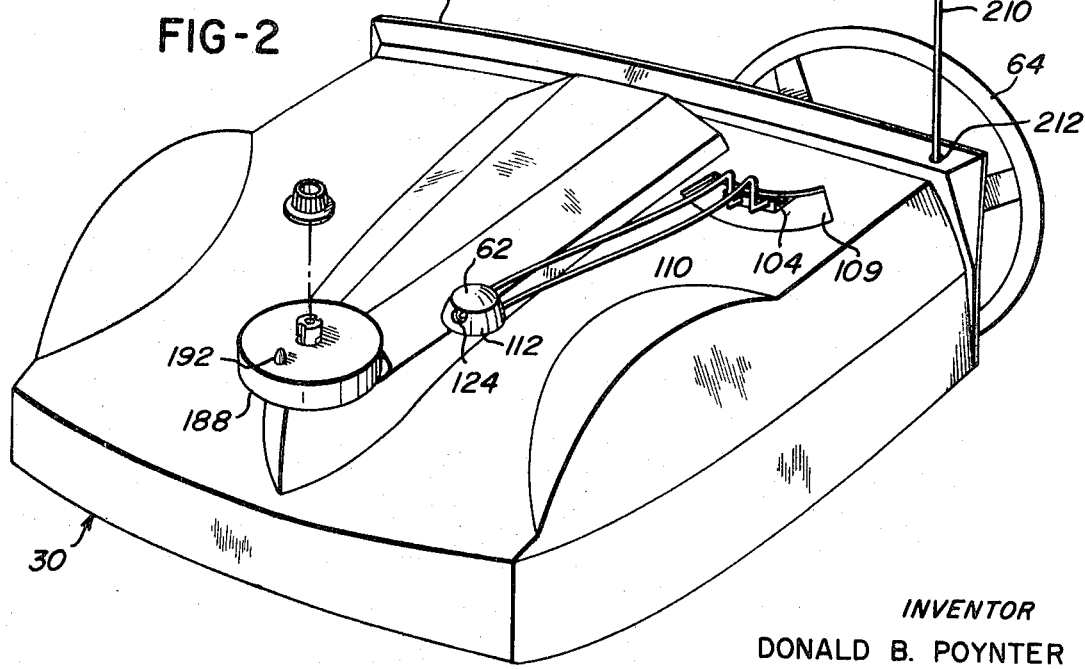
FIG. 2 is a perspective front view of the device, with the turntable and miniature vehicle removed.

Referring now to FIG. 2, the reference numeral 210 indicates a dummy antenna mounted upon the console at 212. The antenna serves as part of a timing device which may be useful when the apparatus is used as a game device requiring an observance of time periods. The antenna may consist of a smooth upright rod upon which is supported a vibratory weight 214 adapted to descend along the rod in a series of brief short jumps as the weight vibrates. Weight 214 is connected to an apertured plate 216 by flexible spring means 218 which keeps the weight in vibration as the plate intermittently sizes the rod as the weight assembly descends while vibrating.

The timing device above described may be detachably applied to the console by providing the console with a socket at 212 loosely receptive of the lower end of rod 210. This arrangement facilitates packing and shipping of the apparatus.

Figure 4:
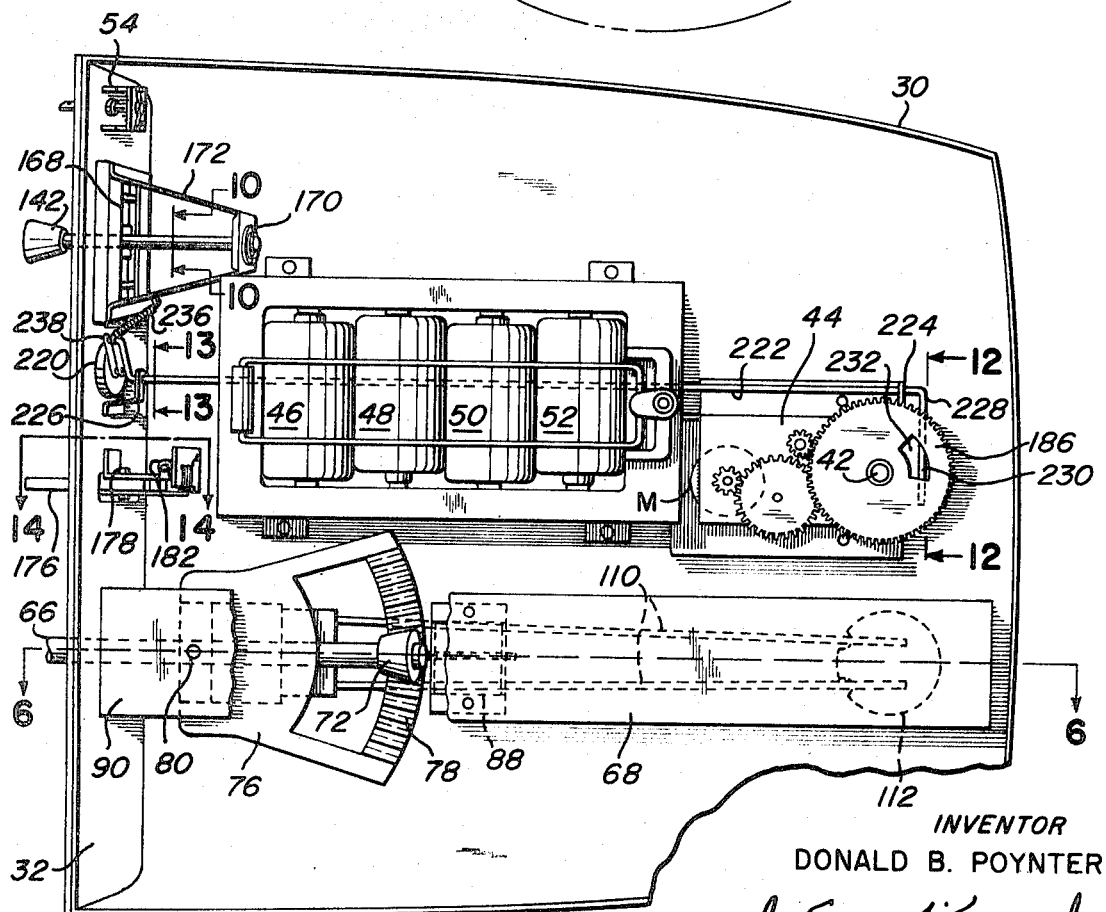
FIG. 4 is a bottom view of FIG. 3 on an enlarged scale.
Figure 19:
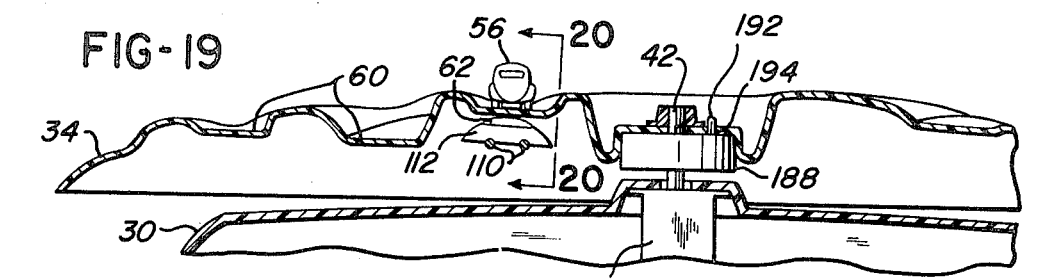
FIG. 19 is a fragmentary cross-section taken on a vertical plane through the turntable drive shaft of FIG. 1, the miniature vehicle being under the control of the magnetic control head.

In using the apparatus as a game, it is sometimes desirable to record the number of full turns or laps executed by the turntable, and for this purpose a "lap counter" may be provided. The lap counter is best illustrated by FIGS. 4, 12 and 13, and is seen to comprise an intermittently operative counting instrument 220 located upon the instrument panel 32 in full view of the operator. The counter, or counting instrument, is adapted to record and indicate the number of complete turns imparted to turntable drive shaft 42 by driven gear 186.

Actuation of counter 220 may be effected by an elongate rock shaft 222 journalled at fixed bearings 224 and 226, and having one end turned at 228 to underlie the gear 186 as a crank. The crank portion may be bent to provide an detent 230 adapted to ride against the smooth underface of gear 186, and to project through an opening 232 of the gear upon each full rotation of the gear. Detent 230 is so formed as to dip into and out of opening 232 without stopping the gear movement.

At the rear end of rock shaft 222 is a crank 234, to which is attached a tension spring 236 acting constantly to bias the shaft 222 rotationally, in proper direction to yielding urge detent 230 against the lower face of gear 186 and to plunge the detent into gear opening 232 whenever the gear opening registers with the detent. Crank 234 at the rear end of the rock shaft has a pivotal connection with the actuator arm 238 of counter 220, so that each dipping movement of detent 230 is translated to actuator arm 238, for recording and indicating the number of detent dips occurring at gear 186.

The counter 220 may be one of any approved type which is simple and inexpensive, and capable of being normalized or re-set to a zero reading whenever the operator so desires, usually by means of a knob 240 or equivalent re-set means. Counter 220 of course, may be actuated by moving parts of the apparatus other than gear 186, if desired.

Some of the instruments appearing on the instrument panel 32 of FIG. 1 perform no function, but are merely representations of instruments such as a speedometer, tachometer, ammeter, heat and pressure gauges, light switches and the like. The representations or dummy instruments of FIG. 1 are those without reference numerals.

With reference to FIG. 22, the arms members 110 may be of electrically conductive material such as metal and if desired, said members may conduct electric current to lamp 124 provided that they are electrically insulated from one another and from the parts 104 and 112.

Figure 26:
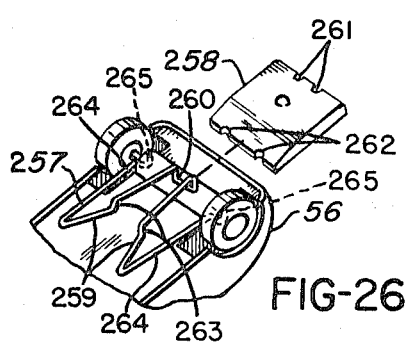
FIG. 26 is a view of the vehicle, with modification.

FIG. 26 illustrates a method of detachably applying to a standard or generally available matchbox vehicle, an accessory permanent magnet 258 which renders such a vehicle adaptable for use with the apparatus of the present invention. In this case, an accessory wire clip 257 may be furnished with the apparatus, for easy mounting upon the front axle or elsewhere upon the matchbox vehicle, said clip having convergent arms 259 terminating in a hook 260. The hook engages spaced notches 261 formed in the leading edge of magnet 258, whereas rearwardly disposed notches 262 of the magnet engage offset portions 263 of arms 259. The inherent resiliency of the clip may be depended upon to embrace and retain the magnet between the offset elongate portions of arms 259 and the mounting arms 264.

As will be understood, the offset elongate portions of the clip located between the hook 260 and the offset portions 263, are in a plane spaced from the plane of mounting arms 264, said planes being spaced apart a distance approximating the thickness of magnet 258, The mounting arms may be provided with terminal hooks 265 to embrace the vehicle front axles and thereby afford a detachable connection for the clip.

What is claimed is:

1. Apparatus for testing driving skill involving use of a miniature vehicle embodying magnetic means, said apparatus comprising in combination: a portable console including an instrument panel; a turntable having a thin upper surface supportive of at least one miniature vehicle for movement relative to and over said surface; motor means including a rotary drive shaft supporting the turntable for rotation with said vehicle superimposed thereon; and steering means including a magnetic head disposable to selected positions beneath and in sufficiently close proximity to said turntable to magnetically attract the magnetic means of the miniature vehicle through the thickness of the turntable, whereby during rotation of the turntable the vehicle is magnetically held to the upper surface of the turntable at locations determined by selected positions of the magnetic head as controlled by said steering means.

2. The combination as defined in claim 1, wherein is included means for varying the speed of rotation of the turntable.

3. The combination as defined by claim 1, wherein is included means for varying the speed and changing the direction of rotation of the turntable.

4. The combination as defined by claim 1, wherein the turntable when in driven relationship with the drive shaft, overlies a substantial area of the console.

5. The combination as defined by claim 1, wherein a portion of the turntable is translucent, and the steering means includes a lamp capable of emitting light rays through the translucent portion of the turntable adjacent to said magnetic head.

6. The combination as defined by claim 5, wherein is included means for varying the speed of rotation of the turntable.

7. The combination as defined by claim 6, wherein is included a releasable clutch associated with the turntable drive means, operative to relieve the drive in the event of interference with rotation of the turntable.

8. The combination as defined by claim 1, wherein the motor means for rotating the drive shaft includes an electric motor and a plurality of dry cells; and manually operative means at the instrument panel for selectively connecting said motor in circuit with different numbers of dry cells to vary the motor speed.

9. The combination as defined by claim 8, wherein said last mentioned means is representative of a typical automotive gear shift lever.

10. The combination as defined by claim 9, wherein is included in circuit with said motor a variable resistor in control of said motor; and means representative of a typical automotive brake lever for actuating said variable resistor.

11. The combination as defined by claim 10, wherein a portion of said turntable is translucent, and the steering means includes an electric lamp capable of emitting light rays through the translucent portion of said turntable adjacent to said magnetic head.

12. The combination as defined by claim 11, wherein said lamp is carried by said magnetic head.

13. The combination as defined by claim 5, wherein said lamp is carried by said magnetic head.

14. The combination as defined by claim 7, wherein said lamp is movable bodily with said magnetic head.

15. The combination as defined by claim 1, wherein is included a counter indicating the number of rotations executed by the turntable or its drive shaft.

16. The combination as defined by claim 1, wherein is included a timing device, and means for detachably mounting the timing device upon the console.

17. The combination as defined by claim 11, wherein is included a counter indicating the approximate number of rotations executed by the turntable; a timing device; and means for detachably mounting the timing device upon the console.

18. The combination as defined by claim 9, wherein a portion of the turntable is translucent, and the steering means includes a lamp capable of emitting light rays through the translucent portion of the turntable adjacent to said magnetic head.

19. The combination as defined by claim 4, wherein portions of the turntable are representative of a travel route, and said travel route is tortuous and undulatory.

20. The combination as defined by claim 19, wherein the travel route portions of the turntable are translucent, and the steering means includes a lamp capable of emitting light rays through the translucent portions of the turntable at a location adjacent to said magnetic head.

21. The combination as defined by claim 1, wherein said steering means includes an elongate arm carrying the magnetic head, said arm being swingable over the console toward and from the rotary drive shaft.

22. The combination as defined by claim 21, wherein portions of the turntable are representative of a tortuous travel route, and said steering means includes an elongate arm carrying the magnetic head, said arm being swingable over the console toward and from the rotary drive shaft, to register the head with said travel route beneath the turntable.

23. The combination as defined by claim 22, wherein the travel route portions of the turntable are translucent, and the steering means includes a lamp capable of emitting light rays through the translucent portions of the turntable at a location adjacent to said magnetic head.

24. The combination as defined by claim 23, wherein the motor means for rotating the drive shaft includes an electric motor and a plurality of dry cells or equivalent; and manually operative means at the instrument panel for selectively connecting said motor in circuit with different numbers of said cells to vary the motor speed.

25. The combination as defined by claim 24, wherein said last mentioned means is representative of a typical automotive gear shift lever.

26. The combination as defined by claim 25, wherein is includable in circuit with said Motor a variable resistor in control of said motor; and means representative of a typical automotive brake lever for actuating said variable resistor.

* * * * *